United States Patent [19]
Porter et al.

[11] 3,716,002
[45] Feb. 13, 1973

[54] SOLID WASTE DISPOSAL METHOD AND APPARATUS

[75] Inventors: Stuart M. Porter, Denver; Ervin C. Weimer; Harold W. Shideler, both of Wheatridge, all of Colo.

[73] Assignee: Stearns-Roger Corporation, Glendale, Colo.

[22] Filed: April 1, 1971

[21] Appl. No.: 130,224

[52] U.S. Cl. .................................. 110/14, 110/15
[51] Int. Cl. ......................................... F23g 5/06
[58] Field of Search ...................... 110/8 R, 14, 15

[56] References Cited

UNITED STATES PATENTS

| | | | |
|---|---|---|---|
| 2,213,667 | 9/1940 | Dundes et al. | 110/14 |
| 1,974,231 | 9/1934 | Bighouse | 110/14 X |
| 2,148,447 | 2/1939 | Dundes et al. | 110/15 |
| 2,043,459 | 6/1936 | Windecker | 110/14 |
| 2,274,780 | 3/1942 | Duerr et al. | 110/14 |

*Primary Examiner*—Kenneth W. Sprague
*Attorney*—Anderson, Spangler & Wymore

[57] ABSTRACT

This invention relates to a solid waste disposal apparatus that includes a rotary furnace arranged upstream of a rotary dryer in end-to-end relation to the latter but separated therefrom by a burning chamber and stationary ash removal subassembly interposed therebetween. The raw feed is mixed with a portion of the dried feed from the discharge end of the dryer and introduced into the intake end of the dryer as a moist mixture containing between approximately 40–60 percent water. The remaining dried material is introduced into the furnace. A forced draft burner at the entrance to the furnace is canted in the direction of furnace rotation so as to direct the hot products of combustion spirally along the wall thereof in concurrent flow relation to the moist mixture. Combustion takes place within the upstream end of the furnace inside a separate hollow combustion chamber that cooperates with the furnace wall to define an annulus into which the dryer gas is recycled and mixed with the products of combustion as they leave the aforesaid combustion chamber to reduce the temperature and axial velocity of the latter preparatory to delivering same to the burning chamber and ash removal subassembly complete with exhaust gas system, and dryer inlet therebeyond. The dryer is intricately baffled with a short fall fill that materially increases its efficiency. The ash removal subassembly includes a hopper into which the ashes fall and are sucked out of the top thereof and used to preheat the primary combustion airstream. The exhaust gases are exhausted through a heat recovery system and then scrubbed prior to release to the atmosphere. The invention also encompasses the novel method of treating solid wastes which comprises mixing the raw waste material with a previously dried portion thereof to make up a mixture having between approximately 40 and 60 percent moisture preparatory to drying same, drying the mixture thus produced with a heated gas mixture formed by combining within a mixing and cooling zone in the furnace the gaseous discharge from the dryer with the gaseous products of combustion generated in a combustion zone immediately upstream thereof, separating the solid products of combustion from the heated gas mixture prior to delivering a portion of the latter to the dryer, drawing off a portion of said heated gas mixture and treating it to remove entrained solids and odors prior to exhausting same to the atmosphere.

18 Claims, 3 Drawing Figures

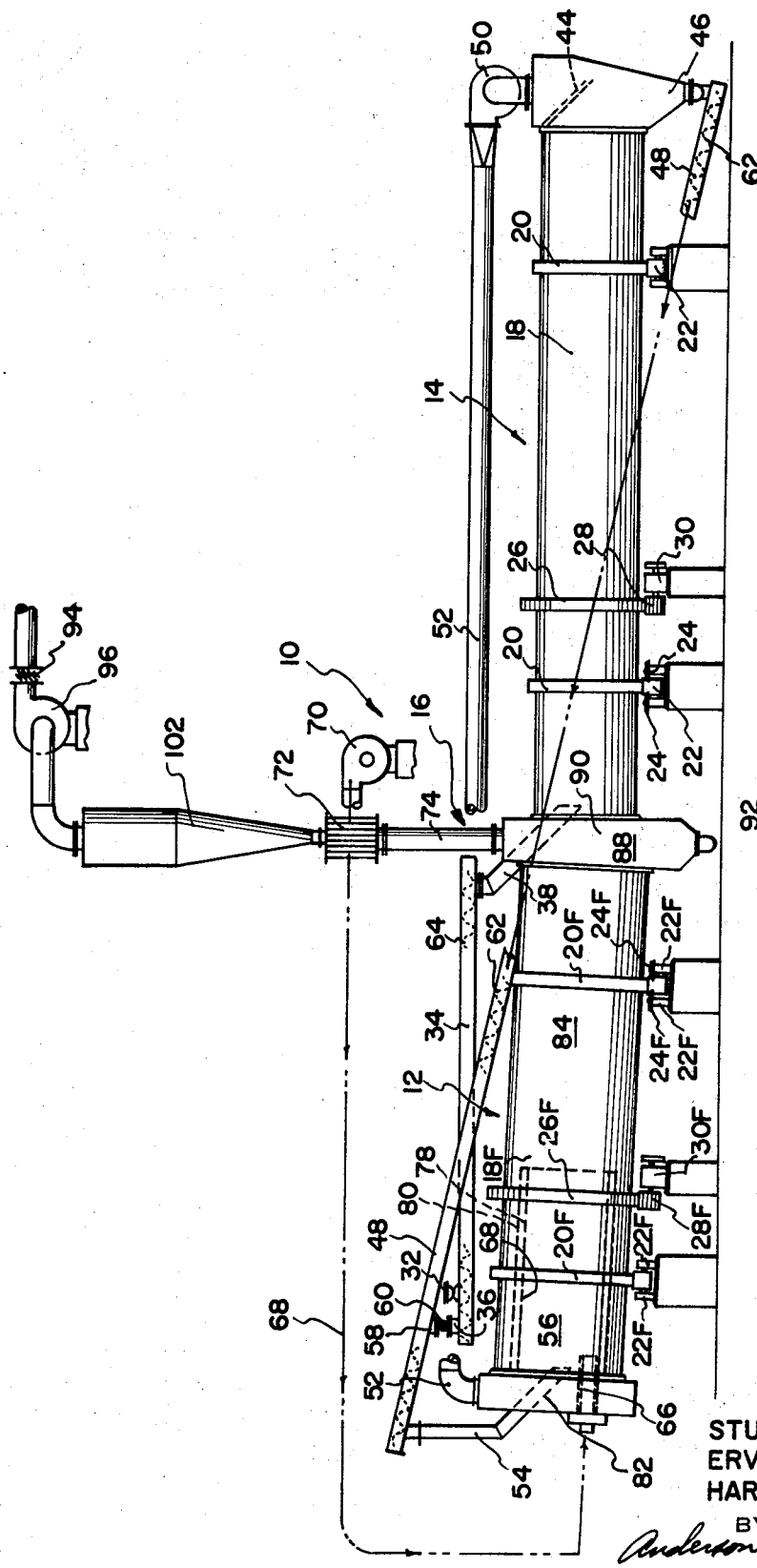

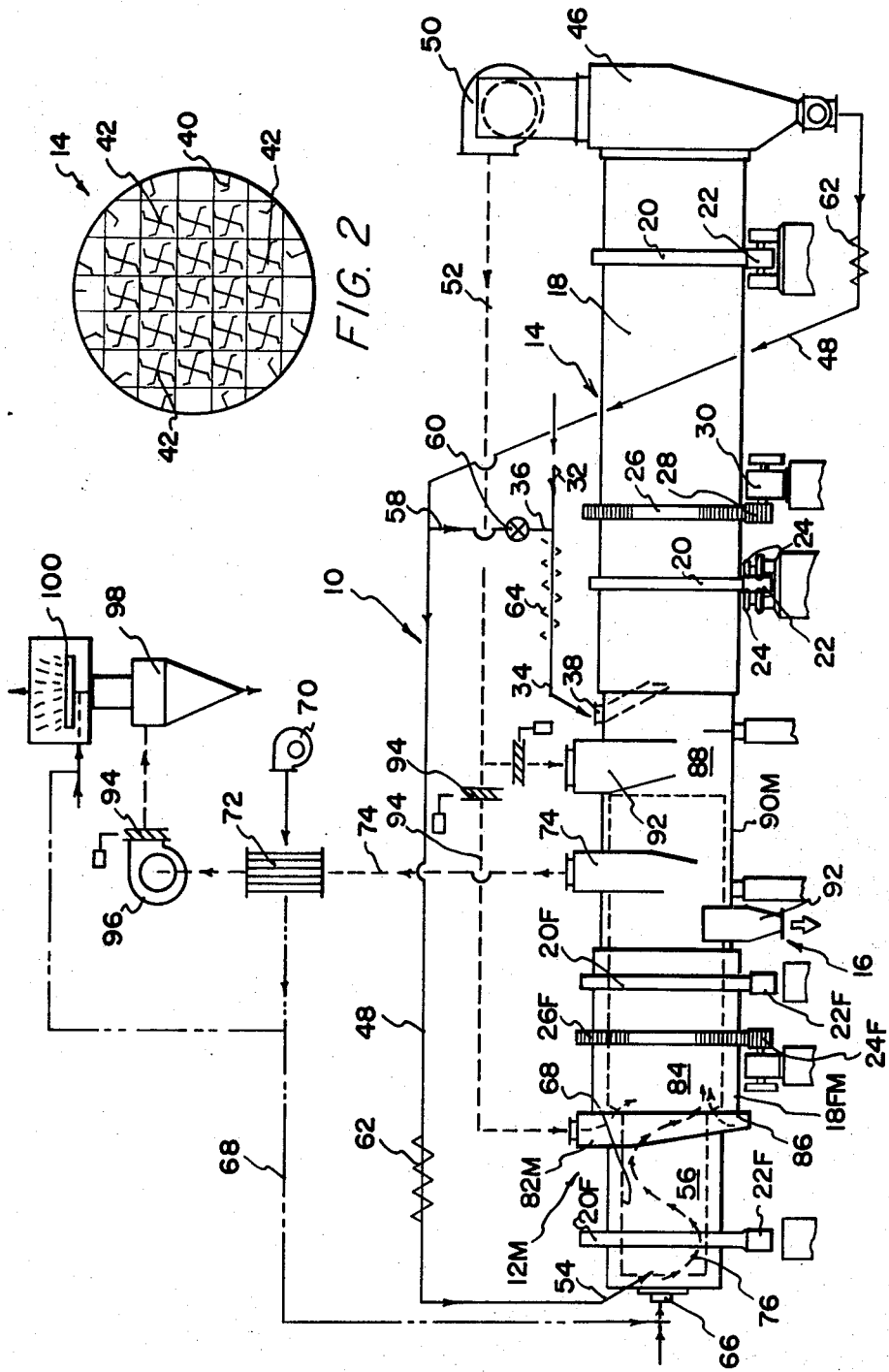

SOLID WASTE DISPOSAL METHOD AND APPARATUS

The ever-increasing quantity of atmospheric pollutants entering the atmosphere has already reached alarming proportions and has become a serious health hazard in many of the world's urban areas. There are many sources responsible for this disturbing condition which range, in addition to the vehicle exhaust omissions, all the way from the backyard incinerator to the huge industrial complex belching black smoke into the atmosphere.

There is a concerted effort being made at the present time to curb these abuses of the environment in both the industrial and private sectors of society. Particular attention is being given to the lessening, and hopefully the substantial elimination, of industrial atmospheric pollution in the form of smoke and obnoxious odors. The cities themselves are often major offenders as they attempt to dispose of the mountains of waste generated daily in the urban community. Unfortunately, this particular problem is a much more involved one that that faced by the ordinary industrial plant which, for the most part, knows precisely what it is dumping into the atmosphere and, therefore, has a better chance of controlling it by adopting appropriate remedial measures such as changing to a different type of fuel, exerting tighter control over a process or preventing the escape of the pollutants in some fashion. The municipal waste disposal facility, on the other hand, has no effective way of controlling the raw material which it must treat and it certainly will have to handle such things as sewage sludge, animal wastes, garbage and refuse of every conceivable type.

It has now been found in accordance with the teaching of the instant invention that atmospheric pollutants such as fly ash, smoke, odors and objectionable gases ordinarily generated when an attempt has been made in the past to incinerate solid waste materials can, in large measure, be eliminated by drying before burning. The drying process is accomplished by first mixing the raw waste with a previously dried portion thereof until the moisture content of the mixture falls within certain prescribed limits. The resultant mixture is of a spongy consistency that does not agglomerate readily and clog the feed lifters within the rotary drum dryer into which it is fed. The moist mixture entering the dryer is dried with a precooled mixture of furnace exhaust gases and recycled dryer gases at a temperature of about 1,200°F. which is well below that at which moist materials tend to smoke. The portion of the dried mixture that is not recycled is incinerated in the combustion zone of a refractory lined rotary furnace after which the solid products of combustion are separated from the gaseous ones and the latter are cooled down to around 1,200°F. preparatory to delivering a portion thereof to the dryer as aforesaid by mixing them with the recycled dryer gases at about 250°F. while the remaining portion is treated to remove any remaining solid wastes entrained therein together with any odors before being released to the atmosphere.

It is, therefore, the principal object of the present invention to provide a novel and improved solid waste disposal apparatus.

A second objective of the invention herein disclosed and claimed is to provide an improved method for disposing of solid wastes.

Another object of the invention forming the subject matter hereof is to provide a waste treatment system wherein the raw wet waste is premixed with dry wastes to control the moisture content thereof preparatory to drying the mixture with low temperature gases.

Still another objective of the within described invention is the provision of a drying and incinerating system for solid waste treatment wherein the exhaust gases from the dryer are mixed with the gaseous products of combustion from the furnace preparatory to recycling same into the dryer or releasing to atmosphere.

Further objects are to provide a solid waste disposal facility that is versatile, economical to operate, relatively small, easy to service and repair, rugged, reliable and efficient.

Other objects will be in part apparent and in part pointed out specifically hereinafter in connection with the description of the drawings that follows, and in which:

FIG. 1 is a somewhat schematic side elevation of the solid waste disposal apparatus of the present invention, portions thereof having been broken away to expose elements otherwise hidden;

FIG. 2 is an end view in highly diagrammatic form illustrating the type of preferred interior baffling within the dryer; and, FIG. 3 is a view similar to FIG. 1 but showing a slightly modified version of the apparatus in the form of a flow sheet.

Referring next to the drawings for a detailed description of the present invention and, initially, to FIGS. 1 and 3 for this purpose, reference numeral 10 has been chosen to represent the solid waste disposal system in its entirety, whereas, numeral 12 is used to similarly denominate the furnace, number 14 the dryer, and 16 the ash removal subassembly interposed between the latter. Since the process starts with the drying operation rather than the incineration of the waste, it will be well to first examine dryer 14 and its appurtenances.

This dryer is of the horizontal rotary drum type wherein drum 18 is encircled at longitudinally-spaced points by circumferential rails 20 which are, in turn, supported atop trunnions 22 that cradle same for rotational movement. Since the dryer has its axis of rotation inclined slightly so that the material being dried therein will gravitate slowly toward the discharge end thereof, trunnions 24 are also needed that lie in rolling engagement with the sides of one of the rails 20, all of which is, of course, quite common in the design of a rotary drum dryer. Rotation of the dryer is accomplished by a conventional meshed set of gears, one of which 26 encircles the drum while the other 28 is mounted on the output shaft of motor 30.

The input to the dryer comprises a moisture controlled mixture consisting partly of wet raw feed and partly of unburned recycled dry feed combined in the proportions necessary to maintain a moisture level of between approximately 40 and 60 percent water. The raw feed which has in excess of 60 percent water is delivered to the raw feed intake 32 of mixing conveyor 34 where it is combined in the proper proportions with the dried, but yet unburned, feed entering dry feed intake 36 of the latter. Both intakes 32 and 36 are, of course, positioned adjacent one another at the upstream end of the mixing conveyor which can take any one of several different conventional forms, the splitflight screw type having been found quite adequate for the purpose. A gravity chute 38 at the discharge end of the mixing conveyor directs the moist mixture into the intake end of dryer 14.

With brief reference to FIG. 2, it will be seen that the dryer preferably has the interior wall thereof provided with feed lifters 40 of conventional design that tumble the mixture and generally contribute to improved drying efficiency. More important than the lifters, however, is the fact that the interior of the dryer is preferably filled with cross-type short fall fill 42 that keeps the moist feed mixture almost constantly in contact with a hot surface that conducts heat directly thereto rather than relying on air drying as the material falls free within the interior of the drum, the latter being much less efficient. Also, the fill 42 leaves very little open space for free fall of the material hence the designation "short fall fill" is used previously.

Now, by controlling the moisture content of the ordinary sticky type waste material entering the dryer to between approximately 40-60 percent water, it has a spongy consistency that will not stick to or otherwise agglomerate on the feed lifters 40 or the cross-type fills 42 thus assuring a proper drying action and an almost completely dehydrated product which leaves the dryer at preferably a temperature approaching 200°F. so that most of the bacteria will have been killed. A wetter mixture of the stick product (one containing in excess of 60 percent water) tends to cake and stick to the hot conduction surfaces resulting in a good deal of surface drying with little of the internal moisture being removed due to inadequate mixing.

Again with reference to FIGS. 1 and 3, the dehydrated mixture that finally gravitates to the discharge end of the dryer leaves same at around 200°F. and strikes a baffle plate 44 (broken lines in FIG. 1) projecting outwardly and downwardly into stationary hopper 46 where separation of the gaseous and solid constituents first takes place. As the dry solids contact the inclined baffle plate, they are directed downwardly into the bottom of the hopper 46 when they drop into the intake end of dry feed conveyor 48; whereas, the gaseous constituents including undoubtedly, some dust and other suspended solids, is sucked out of the top of the hopper 46 by suction fan 50 which delivers it into the intake end of recycle gas duct 52 at a temperature of around 250°F. Now, dry feed conveyor 48 extends from the bottom of hopper 46 at the discharge end of the dryer 14 up to the intake end of furnace 12 where gravity chute 54 delivers the dry feed directly into the combustion zone 56 thereof. Branch 58 in the dry feed conveyor upstream of the discharge end thereof shunts a portion of the dry feed off into dry feed intake 36 for recycling with the wet feed in the form of the moist mixture entering the dryer or dehydrator 14. A valve 60 interposed between the dry feed conveyor 48 and the mixing conveyor 34 is used to control the proportion of the dry feed that is recycled to produce the moist mixture having the desired water content.

In the particular form shown, dry feed conveyor 48 is of screw-type as was the case with the mixing conveyor 34 already described. In the dry feed conveyor, on the other hand, a solid helicoidal auger flighting 62 would be preferred to the split or ribbon-type helicoidal flighting 64 ordinarily employed in screw-type mixing conveyors. Here again, conveyors for the dry feed of other than the screw-type can, undoubtedly, be used, but, from the standpoints of both economics and efficiency in material movement, there would seem to be little reason for using any other type of conveyor.

Continuing on with an examination of FIGS. 1 and 3, the furnace 12 will be seen to be of the refractory lined rotary type having its rails 20F cradled in trunnions 22F and 24F while its drum 18F is driven by motor 30F and meshed gears 26F and 28F in much the same manner as the dryer already described. As shown, the furnace 12 of the FIG. 1 apparatus has its axis of rotation tilted downwardly to a somewhat greater degree than its companion dryer 14 in order to maintain about the same thru-put while permitting the furnace drum to be turned more slowly for the purpose of insuring complete combustion.

The burner 66 is located at the entrance to the combustion zone 56 in the intake end of the furnace. Preheated combustion air enters the furnace at the same point through combustion air duct 68 through which the air is forced by means of fan 70 located at its intake end. In the preferred embodiment of the invention, this combustion air is preheated by passing it in heat exchange relation over heat exchanger 72 located in the stack 74 that carries the hot exhaust gases.

Burner 66 can be any one of several commercially available types that burn gas, oil, coal, sander dust, hogged fuels or any other suitable fuel. About the only feature of burner 66 deserving of specific mention is its orientation relative to the furnace. The burner is preferably oriented such that the flame issuing therefrom will circulate helically along the inside wall 68 of the combustion zone in concurrent flow relation to the dry feed progressing therethrough as indicated by the arrows 76 in FIG. 3. This swirling flame pattern inside the combustion zone 56 removes any residual moisture left in the dry feed from the dryer and incinerates it until all that is left as residue are the ashes and gaseous products of combustion.

Now, in the furnace of FIG. 1, the combustion zone 56 is defined by a tubular member 78 located within the intake end of the drum 18F so as to leave an annular space 80 therebetween. In the particular form shown, number 78 is cylindrical and coaxial with the drum although terminating well short of the discharge end of the latter. The dry feed inlet chute 54 discharges the feed into about the center of the combustion zone defined by member 78 and the burner 66 is offset toward the bottom of the latter.

The significance of annular space 80 surrounding the combustion zone is that a circular manifold 82 is mounted in stationary position at the entrance to the furnace connected to receive the gases discharged from the dryer through duct 52 and directed same into this annulus. Thus, while the dry solid wastes are being incinerated at a temperature of around 2,500°F. within the combustion zone 56, the considerable cooler gases from the dryer (250° F.) are moving along the outside thereof within annulus 80.

The waste material is completely burned within combustion zone 56 where it is in intimate contact with the burner flame. The ashes leaving the end of tubular member 78 drop directly down into the bottom of the furnace while the gaseous products of combustion combine with the cooler dryer gases to form a mixture for drying purposes having a temperature of around 1,200°F. that will dehydrate the moist waste material entering the dryer without causing it to smoke. Thus, despite the fact that the temperature within the combustion zone is quite high (2,500°F. or so), the gases entering the dryer have been cooled down considerably to around 1,200°F. thereby eliminating the intermediate temperature range of between approximately 1,400°F. and 1,800°F. where wet materials tend to smoke the worst.

Before providing further with a description of the gaseous and solid product separation and discharge that takes place at the interface between the adjacent ends of the furnace and dryer, it would be advisable to examine briefly the modified furnace 12 as of FIG. 3. Combustion zone 56 remains much the same except that it is not housed within a tubular member 78 not is it encircled by cold gas annulus 80 as was the case with the FIG. 1 configuration. Instead, drum 18FM is enlarged at the interface between the combustion zone 56 and the cooling zone 84 adjacent thereto to define a shoulder 86 facing back upstream against which abuts the stationary collar 82M that defines the cool air manifold. Suitable openings (not shown) in the manifold and rotating shoulder of the drum register with one another upon relative rotational movement therebetween and mix the cool dryer air with the products of combustion leaving the combustion zone. Thus, the mixing of the combustion products and dryer air takes place immediately at the end of the combustion zone rather than having them move along in the furnace side-by-side but separated physically from one another prior to being combined at much the same point.

Returning once again to FIGS. 1 and 3, both systems include a separation zone 88 interconnecting the furnace 12 and the dryer 14 within which the solid products of combustion are separated from the gaseous constituents. Each includes a stationary coupling member 90, the upstream end of which is connected to the discharge end of the furnace and is adapted to receive both the solid and gaseous products therefrom while the downstream end is connected to deliver the pre-cooled products of combustion into the dryer entrance. Moist feed mixture chute 38 enters the dryer through this coupling 90 in both configurations. Also, both units have the exhaust gas stack 74 connected into the top of coupling 90 and a solid waste receiver 92 in the bottom thereof. The ashes entering the solid waste receiver 92 are disposed of elsewhere in the usual manner while the gaseous constituents are divided into two portions, one passing up the stack 74 for further processing in a manner to be explained presently while the rest are recycled back into the mouth of the dryer. Up to approximately 50 percent of the gas leaving the discharge end of the dryer can be recycled while the remainder passes out through the stack. In the particular form of the coupling 90M illustrated in FIG. 3, it includes a dryer gas by-pass 92 at the throat or mouth of the dryer connected to take some gas from dryer gas duct 52 before it reaches the entrance to the furnace. Dampers 94 in duct 52 and by-pass 92 downstream of the intersection therebetween enable the relative proportions of the dryer gas directly recycled and passing on to the furnace for cooling purposes to be varied.

Finally, the exhaust gases leaving the system through stack 74 are preferably given further treatment to eliminate entrained dust and odors before being discharged to the atmosphere. Fan 96 sucks the exhaust gases up the stack where, in FIG. 3, they pass through a cyclone separator 98 which drops out any remaining suspended solids. The exhaust gases leaving the cyclone stack can, if necessary, be fired in afterburner 100 to remove any residual odors or smoke as shown schematically in FIG. 3.

FIG. 1 shows the use of a scrubber 102 in the stack to knock down entrained solids in place of the cyclone 98 shown in FIG. 3. Such a scrubber can use either water or chemical scrubbers depending upon the make up of the exhaust gases. Here again, an afterburner can be added if necessary. A single 8 foot diameter drum dryer will handle approximately 300 tons/day of raw waste material when incorporated into a waste treatment facility of the type forming the subject matter hereof. Other dryer drums are available in diameters from 4 to 12 feet with comparable capacities.

What is claimed is:

1. The solid waste disposal apparatus which comprises: a horizontally-disposed rotating drum furnace having a combustion zone adjacent the intake end thereof and a cooling zone adjacent its outlet end; a horizontally-disposed rotating drum dryer positioned with its inlet end in axially spaced relation to the outlet end of the furnace; stationary hopper means positioned to receive the dry solids and dryer gases discharged from the dryer; dry solids conveyor means connected to receive the dry solids discharged into the hopper from the dryer and deliver same into the combustion zone of the furnace through the intake end thereof; forced draft gas conduit means connected to receive the dryer gases discharged into the hopper from the dryer and introduce same into the cooling zone thereof in position to mix with the gaseous products of combustion issuing from the combustion zone; burner means mounted in the inlet end of the furnace in position to direct a flame into the combustion zone thereof; a source of combustion air connected into the burner; raw feed mixing conveyor means connectable to a source of wet solid wastes and connected to deliver same into the dryer inlet; dryer feed blending means comprising a flow controlled conduit connected between the raw feed conveyor and dry solids conveyor means adapted to recycle a portion of the latter to be mixed with the raw feed to form a moisture controlled mixture; stationary coupling means defining a passage interconnecting the discharge end of the furnace and the inlet end of the dryer adapted to pass the precooled mixture of the recycled dryer gases and products of combustion into the latter; ash removal means connected into the bottom of the coupling means adapted to remove the incinerated solid wastes generated in the combustion zone of the furnace therefrom; and, an exhaust gas stack connected into said coupling positioned and adapted to remove a portion of the precooled mixture entering the dryer.

2. The solid waste disposal apparatus as set forth in claim 1 in which: a heat exchanger is located downstream of the stack connected to receive the exhaust gases therefrom; and, in which the source of combustion air comprises a forced draft air duct connected to pass the combustion air in heat exchange relation to said heat exchanger.

3. The solid waste disposal apparatus as set forth in claim 1 in which: dust removal means is located downstream of the stack connected to receive the exhaust gases therefrom and remove any entrained solids prior to releasing same to the atmosphere.

4. The solid waste disposal apparatus as set forth in claim 1 in which: by-pass conduit means is connected between the forced draft conduit means and the dryer inlet operative to recycle a portion of the dryer gas without circulating same through the furnace.

5. The solid waste disposal apparatus as set forth in claim 1 in which: the furnace includes interior wall means adjacent the intake end cooperating with the adjacent furnace wall to define an annular air duct separate from the combustion zone but merging therewith at the entrance to the cooling zone; and, in which a stationary manifold communicates the interior of said annular furnace duct and is connected to receive dryer air from the forced draft gas conduit means.

6. The solid waste disposal apparatus as set forth in claim 1 in which: the furnace is provided with dryer air intake ports opening onto the exterior thereof at the interface between the combustion and cooling zones; and, in which a stationary manifold-forming collar encircles said dryer air intake ports and is connected to the forced draft gas conduit means for delivering dryer air to the latter.

7. The solid waste disposal apparatus as set forth in claim 1 in which: the burner means is canted to direct the flame issuing therefrom through the combustion zone along a helicoidal path in concurrent flow relation to the dry solid wastes being incinerated therein.

8. The solid waste disposal apparatus as set forth in claim 1 in which: feed lifters are provided on the inside periphery of the dryer and the interior thereof contains baffling with an x-shaped cross section that defines a short fall fill.

9. The solid waste disposal apparatus as set forth in claim 1 in which: an afterburner is located downstream of the stack connected to receive the exhaust gases therefrom and reincinerate any entrained solids left therein.

10. The solid waste disposal apparatus as set forth in claim 3 in which: the dust removal apparatus comprises a cyclone.

11. The solid waste disposal apparatus as set forth in claim 3 in which: the dust removal apparatus comprises a scrubber.

12. The solid waste disposal apparatus as set forth in claim 11 in which: a flow control damper is connected into the by-pass conduit means for regulating the volume of dryer gas recycled directly to the dryer.

13. The method for drying and incinerating wet solid waste materials which comprises: dehydrating a moist solid waste mixture having a moisture content of between approximately 40 percent and approximately 60 percent by-passing a warm gas mixture at a temperature of approximately 1,200°F. in heat exchange relation thereto; recycling a portion of the dehydrated mixture with raw wet feed to produce the moist mixture having the required moisture content; burning the remainder of the dehydrated mixture; cooling the hot dry gaseous products of combustion with a recycled portion of the wet gaseous products of dehydration to produce said warm gas mixture preparatory to dehydrating the moist solid waste mixture therewith; separating the solid products of combustion from the warm gas mixture; and exhausting a portion of the warm gas mixture while using the remainder thereof containing up to approximately 50 percent recycled gaseous products of dehydration for dehydrating the moist solid waste mixture.

14. The method as set forth in claim 13 which includes the step of: scrubbing the warm exhaust gas mixture to remove suspended solids therefrom.

15. The method as set forth in claim 13 which includes the step of: reburning the warm exhaust gas mixture to incinerate solids suspended therein.

16. The method as set forth in claim 13 which includes the step of: centrifugally treating the warm exhaust gas mixture to remove suspended solids therefrom.

17. The method as set forth in claim 13 which includes the step of: directly recycling a portion of the cool wet gaseous products of dehydration by mixing same with the portion of the warm gas mixture used for dehydration purposes after the latter has been mixed.

18. The method as set forth in claim 13 which includes the step of: reburning the warm exhaust gas mixture to eliminate odors therein.

* * * * *